May 28, 1940.  A. C. HOOF  2,202,422
REMOTE CONTROL FOR GOVERNORS
Filed Aug. 2, 1937  2 Sheets-Sheet 1
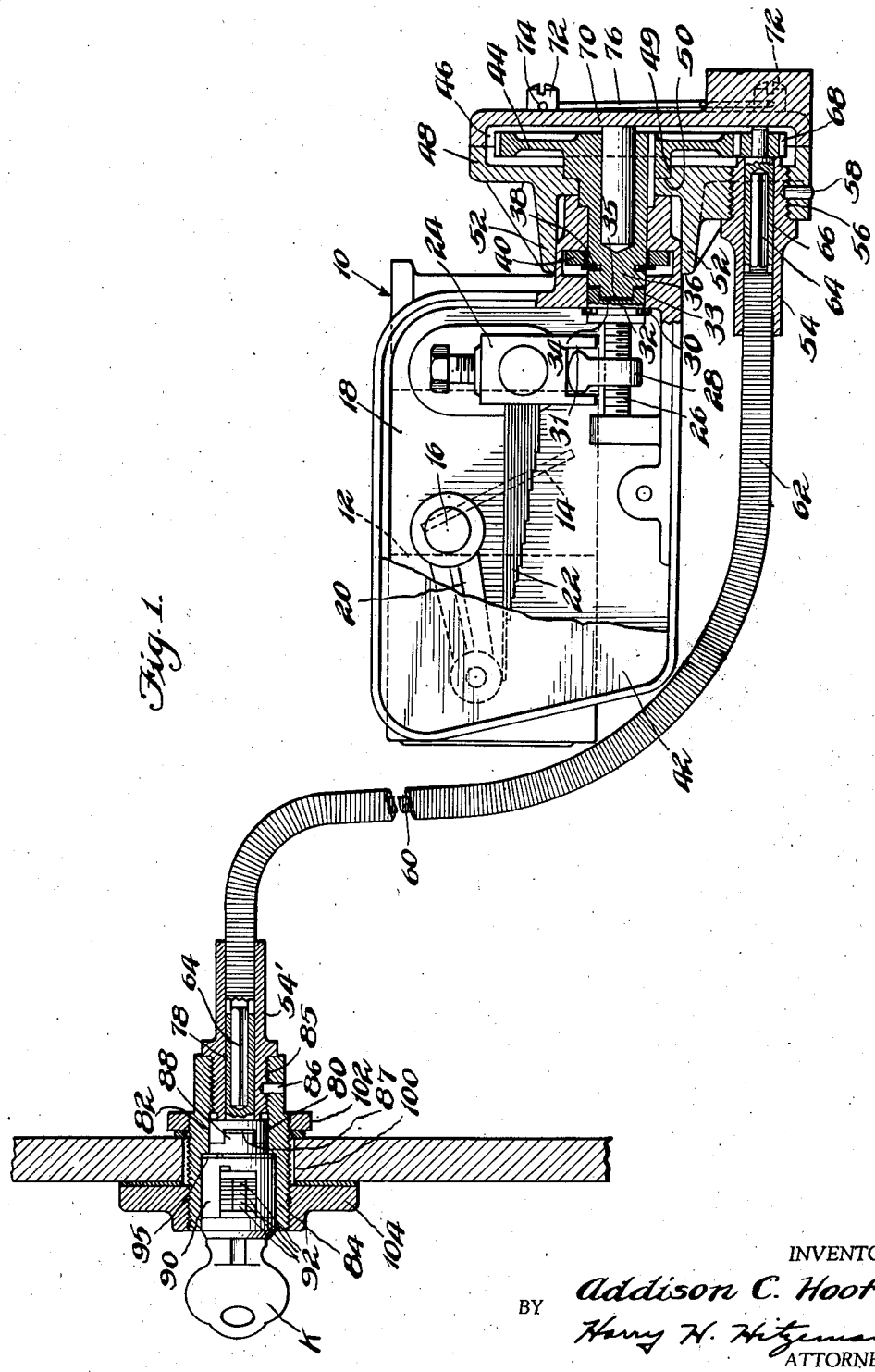
INVENTOR.
Addison C. Hoof
BY Harry H. Hitzeman
ATTORNEY.

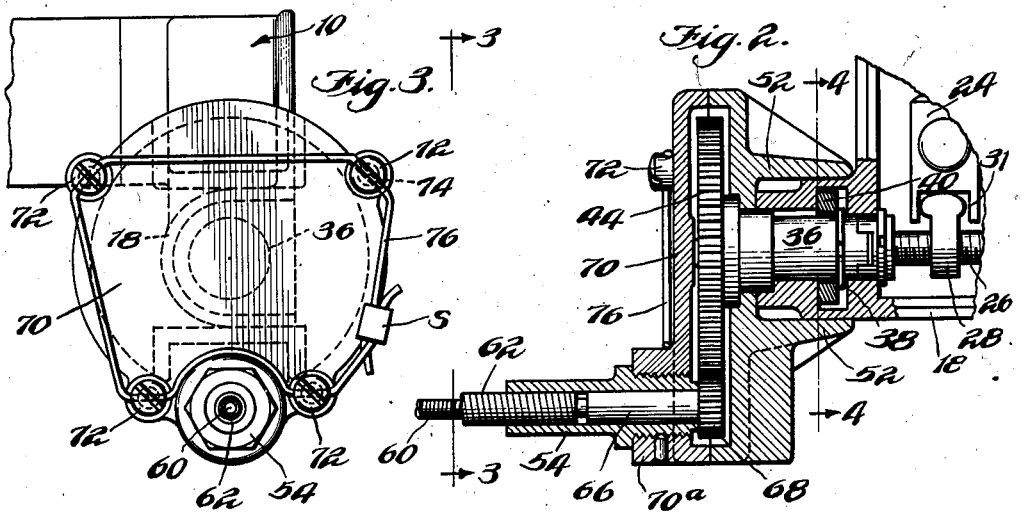
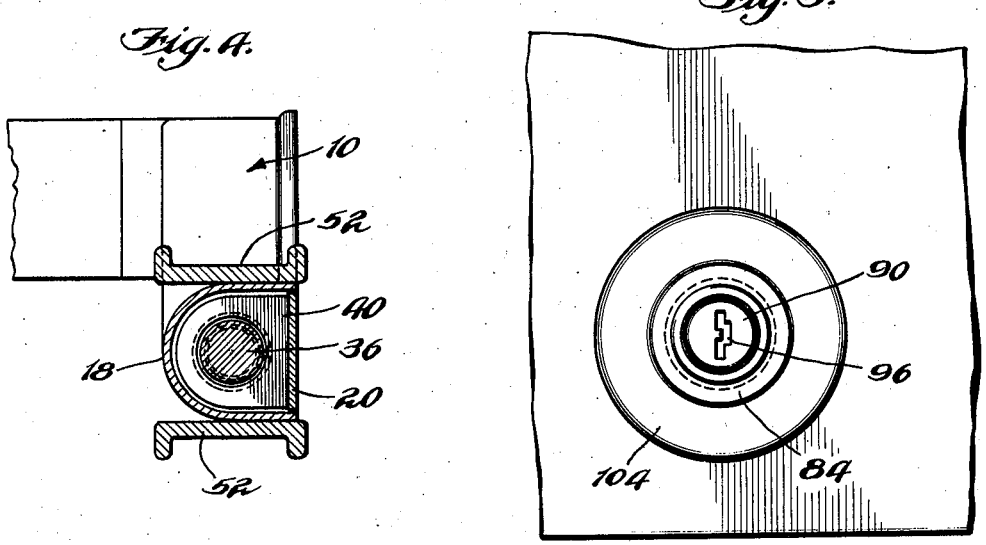
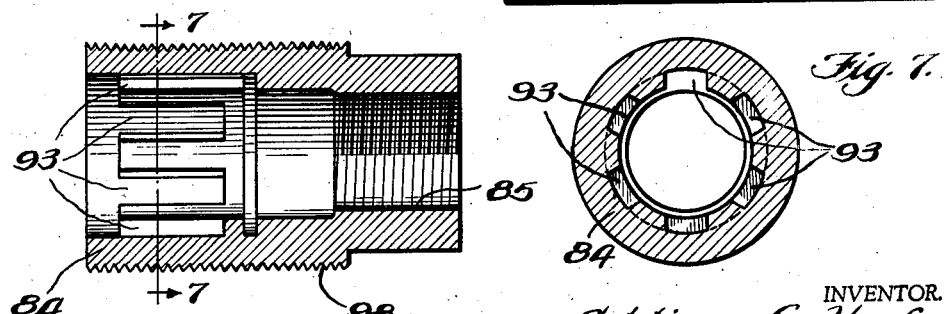

Patented May 28, 1940

2,202,422

UNITED STATES PATENT OFFICE 2,202,422

REMOTE CONTROL FOR GOVERNORS

Addison C. Hoof, Hinsdale, Ill.

Application August 2, 1937, Serial No. 157,061

4 Claims. (Cl. 74—606)

My invention relates to improvements in governors and like devices.

My invention relates more particularly to improvements in governors for internal combustion engines where a throttle valve is inserted in the conduit leading to the intake manifold and the closing movements thereof under the forces created by the suction of the cylinder displacement at different loads for a desired speed are balanced by a spring resistance.

The principal object of the present invention is to provide improved key controlled means for adjusting the governor, and maintaining the same in a desired adjusted position.

A further object of the present invention is to provide improved means of the class described capable of operation from a point remotely placed from the governor, such as the dashboard or the instrument panel of an automotive vehicle.

A further object is to provide an improved key control means of the class described capable of operation from the driver's seat of an automobile.

A further object of the invention is to provide an improved construction of remote control assembly capable of being easily and quickly installed and connected with governors of the type at present on the market.

A further object is to provide in a remote key control of the class described, a compact assembly which may be installed as a unit on governors of a certain type already on the market.

Other objects and advantages will be more apparent from the following description wherein reference is had to the accompanying two sheets of drawings, upon which Fig. 1 is a fragmentary sectional view through the instrument panel of an automobile and through the governor positioned in the intake conduit of the automobile engine;

Fig. 2 is a fragmentary vertical sectional view through a portion of the remote control mechanism and a portion of the governor controlled thereby;

Fig. 3 is a fragmentary sectional view taken generally on the lines 3—3 of Fig. 2;

Fig. 4 is a fragmentary sectional view showing the manner in which the remote control assembly is locked on the governor housing and is taken generally on the lines 4—4 of Fig. 2;

Fig. 5 is a fragmentary front elevational view of the dashboard showing the location of the key control means for the governor.

Fig. 6 is a sectional view through the lock cylinder housing, and

Fig. 7 is a vertical sectional view thereof taken on the lines 7—7 of Fig. 6.

The governor unit 10 may be of the type shown and described in the patent to Addison C. Hoof, No. 1,966,722, and may comprise generally the conduit portion 12 within which a plate valve 14 is mounted upon a shaft 16 and a housing portion 18 within which the arm 20, secured to the end of shaft 16, bears against the end of a multiple leaf spring 22 that is securely mounted in a plug member 24. The plug member 24 is mounted upon a pivot and adapted to be adjusted to change the initial position of the spring resistance means 22. For this purpose a screw member 26 is provided. A nut 28 threaded thereon is adapted to engage in a recess 31. Thus, by rotation of the screw member 26 the adjustment of the spring resistance is secured.

As described in the aforementioned patent, the screw member 26 is held in position in the housing 18 by a split washer 30 and has an end 32 extending through a bore 33 in one wall of the housing. The end 32 is formed with a transverse slot 34 to receive a stud 35 on the end of a plug member 36. The plug member 36 is adapted to be held in the bore 33 through the wall of the housing by a split washer 38 which engages behind the lug 40 that is formed integral with the cover plate 42 and is locked into position on the governor in connection with the plug member 36.

The plug member 36 has a gear wheel 44 formed integral therewith and positioned in the chamber 46 in a gear housing 48. The gear housing 48 is formed with a bore 49 and a shoulder 50 to engage complemental portions of the plug member 36. The housing 48 may be formed with a pair of right angle lug portions 52 which engage the side walls of the housing 18, and by means of the spring washer 38, the plug, gear and housing are locked in position on the governor housing 18.

The gear housing 48 may have a flexible shaft connector body 54 screw threadedly engaged in a tapped opening 56 therein. The connector body is held in position by a pin member 58. I provide a flexible shaft formed with the drive portion 60 and the flexible housing 62 which is connected between the body 54 and a similar body 54' at its opposite end. The flexible shaft 60 may be formed with the driving ends 64 and in the gear housing drivingly engage the shaft 66, upon the end of which a pinion 68 is mounted. The gear housing 48 is provided with a cover plate 70 held in position by the cap screws 72 that engage tapped openings in the housing. The cap screws 72 are provided with openings 74 to receive the wire 76 which may be extended through all of the cap screws and have its ends connected by a seal member S to prevent tampering with the mechanism in the gear housing after the same has been assembled together and sealed.

The opposite end of the flexible shaft 60 is mounted in driving relation to a plug member 78 which is formed with an enlarged portion 80 mounted in the bore 82 of a cylinder lock housing 84. The flexible shaft connector body 54' is adapted to screw threadedly engage in the tapped opening 85 in the lock housing 84 and be secured therein against rotation by a pin member 86. The stud 78 is formed with a transverse slot 87 in its end to engage a lug 88 on the end of the lock cylinder 90. The lock cylinder may be of the usual type which is provided with locking tumblers 92 adapted to engage in any one of the slots 93 formed in the lock housing 84. It will be noted that six transverse slots 93 are provided, thus permitting one-sixth of a turn of the lock and the locking of the cylinder in a one-sixth turn position. The lock cylinder 90 is held in position in the housing 84 by a spring washer 95. A key K is adapted to be inserted through the opening 96 for rotation of the lock cylinder.

The housing 84 may be formed with an external thread 98 and be extended through an opening 100 in the dashboard or instrument panel of an automobile. By means of a nut 102 and washer positioned on the back of the dashboard and a collar 104 positioned on the front of the dashboard, the assembly may be rigidly secured in position at the dashboard.

From the foregoing description, it will be apparent that when it is desired to change the adjustment of the spring resistance member 22, that by inserting a key in the lock cylinder 90 and aligning the tumblers 92 so that the cylinder may be rotated, the flexible shaft 64 will be rotated and through the pinion 68 and the gear 44 the screw member 26 in the governor will also be rotated.

Due to the fact that I have provided the adjustment described in the lock cylinder housing and the fact that there is a reduction between the pinion 68 and the gear 44, it will be obvious that a very minute adjustment of the governor can be accomplished. Thus, in the arrangement shown, one complete turn of the key will cause only one-fifth of a turn of the screw member 26 in the governor housing. From the foregoing it will be apparent that a comparatively simple, yet effective and fool-proof remote control mechanism has been provided due to the fact that the cover of the governor and the gear housing are both locked upon the governor by the spring washer 38. It will be apparent that tampering with any of the mechanism is thus prevented. The placing of a wire and seal through the cover bolts on the gear housing likewise will prevent unauthorized tampering with these members.

In Fig. 2 I have shown a modification of the gear housing wherein the flexible shaft connector body 54 is connected through a boss 70a formed upon the face of the housing cover 70. It will be obvious that all of the parts may be the same and this modification is simply provided where it is desirable to have the flexible shaft extend away from the governor toward its remote control position, rather than around as shown in Fig. 1.

While I have illustrated and described a specific embodiment of my invention, it will be apparent to those skilled in the art that changes and modifications may be made in the exact detail shown, and I do not wish to be limited in any particular; rather what I desire to secure and protect by Letters Patent of the United States is:

1. In an apparatus of the class described comprising a spring housing, rotatable means in said spring housing, a bore communicating with the interior of said housing, and a cover plate for said housing having a lug projecting interiorly of said housing when the cover is in closed position, a control shaft means adapted to engage said bore and said lug, releasable means interlocking with said shaft and engageable behind said lug within the housing for sealingly retaining the shaft in operative position and holding the cover upon the housing, gear means on said shaft and a gear housing axially retained upon the spring housing by said shaft.

2. In an apparatus of the class described comprising a spring housing, rotatable means in said spring housing, a bore communicating with the interior of said housing, and a cover plate for said housing having a lug projecting interiorly of said housing when the cover is in closed position, a control shaft means adapted to engage said bore and said lug, releasable means interlocking with said shaft and engageable behind said lug within the housing for sealingly retaining the shaft in operative position and holding the cover upon the housing, gear means on said shaft and a gear housing axially retained upon the spring housing by said shaft, and a flexible shaft operatively connected to said gear means for remote adjustment of said control shaft.

3. In an apparatus of the class described comprising a spring housing, rotatable means in said spring housing, a bore communicating with the interior of said housing, and a cover plate for said housing having a lug projecting interiorly of said housing when the cover is in closed position, a control shaft means adapted to engage said bore and extending through said lug to retain the cover upon the spring housing, releasable means interlocking with said shaft and engageable behind said lug within the housing for sealingly retaining the shaft in operative position and holding the cover upon the housing, gear means on said shaft and a gear housing axially retained upon the spring housing by said shaft.

4. A device as defined in claim 1 wherein said gear housing is provided with portions interfitting with said spring housing, said portions comprising means to prevent relative displacement of said housings in an angular direction about said shaft.

ADDISON C. HOOF.